(12) United States Patent
Tsujimoto

(10) Patent No.: US 6,975,053 B2
(45) Date of Patent: Dec. 13, 2005

(54) ROTATOR DRIVING DEVICE, IMAGE FORMING APPARATUS USING THE ROTATOR DRIVING DEVICE, AND METHOD OF DRIVING ROTATOR

(75) Inventor: Takahiro Tsujimoto, Toyokawa (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 10/885,703

(22) Filed: Jul. 8, 2004

(65) Prior Publication Data

US 2004/0257014 A1 Dec. 23, 2004

Related U.S. Application Data

(62) Division of application No. 10/184,874, filed on Jul. 1, 2002, now Pat. No. 6,768,235.

(30) Foreign Application Priority Data

| Mar. 10, 1999 | (JP) | ................................. 11-064051 |
| Mar. 30, 1999 | (JP) | ................................. 11-089806 |
| Mar. 30, 1999 | (JP) | ................................. 11-089807 |

(51) Int. Cl.[7] .......................................... H02K 49/00
(52) U.S. Cl. ................................... 310/103; 310/105
(58) Field of Search ............................. 310/103–105, 310/68 B, 75 R

(56) References Cited

U.S. PATENT DOCUMENTS

| 2,481,360 A | * | 9/1949 | Sprenger .................... 310/100 |
| 3,523,204 A | * | 8/1970 | Rand ........................... 310/94 |
| 3,953,125 A | | 4/1976 | Bost ............................ 355/83 |
| 4,486,176 A | * | 12/1984 | Tardieu et al. ............... 433/133 |
| 4,723,145 A | | 2/1988 | Takada et al. ................ 399/36 |
| 4,751,486 A | * | 6/1988 | Minato ........................ 335/272 |
| 4,918,344 A | | 4/1990 | Chikamori et al. ........... 310/83 |
| 4,968,997 A | | 11/1990 | Saitoh et al. ................ 346/136 |
| 5,203,748 A | | 4/1993 | Sawada et al. .............. 475/183 |
| 5,319,418 A | | 6/1994 | Fujimoto et al. ............ 355/200 |
| 5,325,151 A | | 6/1994 | Kimura et al. .............. 399/227 |
| 5,514,926 A | * | 5/1996 | Bushman ..................... 310/105 |
| 5,528,343 A | | 6/1996 | Tada et al. ................... 355/200 |
| 5,569,111 A | | 10/1996 | Cho et al. .................... 475/149 |
| 5,569,967 A | * | 10/1996 | Rode ........................... 310/103 |
| 5,708,933 A | | 1/1998 | Nogami et al. .............. 399/167 |
| 5,761,580 A | | 6/1998 | Harada et al. ............... 399/167 |
| 5,768,656 A | | 6/1998 | Nagasue et al. ............. 399/75 |
| 5,905,927 A | | 5/1999 | Inoue et al. ................. 399/167 |
| 5,943,532 A | | 8/1999 | Ohnuma ...................... 399/167 |
| 5,995,802 A | | 11/1999 | Mori et al. ................... 399/394 |

(Continued)

FOREIGN PATENT DOCUMENTS

JP          4-245261          9/1992

(Continued)

*Primary Examiner*—Dang Le
(74) *Attorney, Agent, or Firm*—McDermott Will & Emery LLP

(57) ABSTRACT

Rotational force of a driving motor is transferred to a photosensitive drum via a planetary-rolle reduction device, so that the photosensitive drum is rotated. A speed detector set on the shaft of the photosensitive drum detects the rotational speed of the photosensitive drum. In accordance with the detected rotational speed of the photosensitive drum, the rotational speed of the driving motor is adjusted so that the photosensitive drum is rotated at a constant speed.

10 Claims, 11 Drawing Sheets

U.S. PATENT DOCUMENTS

| | | | |
|---|---|---|---|
| 6,118,963 A | 9/2000 | Fujikura et al. | 399/167 |
| 6,125,253 A | 9/2000 | Tashima et al. | 399/167 |
| 6,166,510 A | 12/2000 | Higashi et al. | 318/685 |
| 6,172,696 B1 | 1/2001 | Fujikura et al. | 347/115 |
| 6,420,807 B1 | 7/2002 | Tsujimoto et al. | 310/83 |
| 6,768,235 B2 * | 7/2004 | Tsujimoto et al. | 310/75 R |

FOREIGN PATENT DOCUMENTS

| | | |
|---|---|---|
| JP | 5-35044 | 2/1993 |
| JP | 5-53381 | 3/1993 |
| JP | 5-180290 | 7/1993 |
| JP | 9-230662 | 9/1997 |

* cited by examiner

ROTATOR DRIVING DEVICE, IMAGE FORMING APPARATUS USING THE ROTATOR DRIVING DEVICE, AND METHOD OF DRIVING ROTATOR

This application is a divisional of application Ser. No. 10,184,874 filed Jul. 1, 2002 now U.S. Pat. No. 6,768,235.

This application is based on applications No. 11-64051, No. 11-89806, and No. 11-89807 filed in Japan, the contents of which are hereby incorporated by reference.

BACKGROUND OF THE INVENTION (1) Field of the Invention

The present invention relates to a rotator driving device for rotationally driving a rotator, such as a photosensitive drum provided in a copier, color printer, facsimile, or the like, and also relates to an image forming apparatus using the rotator driving device and a method of rotating such a rotator.

(2) Related Art

In general, a high degree of uniformity is required to rotate a rotator. The reason why the high-degree uniformity is required is given for a case of a photosensitive drum provided as a rotator in, for example, a copier.

The photosensitive drum is rotated in one direction, and a laser beam scans the surface of the photosensitive drum in the direction of the axis of rotation (i.e. the main scanning direction) at every scanning cycle. As a result of scanning, an electrostatic latent image is formed on the surface of the photosensitive drum. If the rotational speed of the drum is unstable, that is, if the drum has nonuniformity in rotation, nonuniformity accordingly occurs in the distances between the scanning lines. This causes inconsistency in the print density on a reproduced image and so deteriorates the image quality. For this reason, a high level of uniformity is required in the rotational speed of the photosensitive drum.

The nonuniformity in rotation is caused by various factors. It may be caused due to eccentricity of the photosensitive drum and thus occur in a cycle of one rotation of the drum. The nonuniform rotation at a low frequency may be caused by torsion of a motor shaft and a load shaft. Meanwhile, the nonuniform rotation at a high frequency may be caused by improper engagement of gearwheels or a timing belt.

To raise the level of uniformity in rotation, a reduction device having a planetary roller instead of gearwheels or a timing belt has been used. By means of this reduction device, the nonuniformity in rotation at a high frequency can be eliminated. This technique is disclosed in Japanese Laid-Open Patent Application Nos. 5-53381 and 5-180290, for example.

The nonuniformity in rotation at a high frequency that is caused by the improper engagement of the gearwheels used as a reduction device can be improved by a rotator driving device that has a planetary roller. However, there is a possibility that the nonuniformity in rotation at a low frequency would increase due to factors, such as a skid of the planetary roller. This problem occurs not only to a photosensitive drum provided in an image forming apparatus. It commonly occurs to other kinds of rotator driving devices that each have a reduction device with a planetary roller and that require uniformity in the rotational speed.

Additionally, a rotator driving device conventionally has to be provided for each rotator, such as a photosensitive drum or developing roller. Therefore, these rotator driving devices to be equipped in an apparatus, such as a copier, occupy a large space, thereby making hard to manufacture the apparatus as compact as possible.

To realize a compact rotator driving device, Japanese Laid-Open Patent Application No. 4-245261, for instance, discloses a technique of rotationally driving a plurality of rotators using only one driving source. To be more specific about this technique, a servomotor that has a reduction device with a planetary roller directly drives one of the provided rotators, and then a rotational force of the servomotor is sequentially transferred to the other rotators via idler rollers.

In this case, however, attention should be paid to that the rotators are mechanically connected to each other via the idler rollers, meaning that the neighboring rotator and idler roller are in contact with each other. With this construction, if low frequency elements, such as nonuniformity in rotation or vibration, occur to one of the rotators, these elements may be transferred to the other rotators via the idler rollers. In addition, if such low frequency elements occur to one of the idler rollers, the following rotators would be adversely affected by this increased nonuniformity. Thus, the aim of realizing a driving device that has a high degree of precision cannot be achieved.

SUMMARY OF THE INVENTION

The first object of the present invention is to provide a novel rotator driving device and an image forming apparatus using the rotator driving device. The rotator driving device of the present invention eliminates nonuniformity in rotation at a low frequency that occurs to a rotator rotated by a reduction device with a planetary roller, so that the rotational speed of the rotator can be more stable. A photosensitive drum provided as a rotator in the image forming apparatus is rotated at a constant speed using the rotator driving device, so that high-quality images can be reproduced.

The second object of the present invention is to provide a novel rotator driving device, an image forming apparatus using the rotator driving device, and a novel method of driving a rotator. The rotator driving device of the present invention can respond to the trend toward size reduction, and prevent nonuniformity in rotation or mechanical vibration of a rotator from adversely affecting another rotator so that each rotator can rotate at a constant rotational speed.

The first object of the present invention can be achieved by a rotator driving device that rotationally drives a rotator, the rotator driving device being made up of: a motor; a planetary-roller reduction unit that outputs a rotational speed that is reduced with respect to a rotational speed of the motor, and transfers a rotational drive force of the motor to the rotator; a speed detector that detects a rotational speed of the rotator; and a controller that controls the rotational speed of the motor in accordance with a detection result obtained by the speed detector.

With this construction, the rotational drive force of the motor serving as the rotational driving source is transferred to the rotator via the planetary-roller reduction unit. Also, the controller controls the rotational speed of the motor in accordance with the detection result obtained by the speed detector. Consequently, nonuniformity in rotation at high and low frequencies is eliminated, so that the rotational speed of the rotator can be maintained constant.

The second object of the present invention can be achieved by a rotator driving device that is provided in an image forming apparatus and that drives first and second rotators provided in the image forming apparatus, the rotator driving device being made up of: a driving unit that includes a motor and supplies a rotational drive force of the motor to the first rotator; a speed detector that detects a rotational speed of the first rotator; a controller that controls a rotational speed of the motor in accordance with a detection result obtained by the speed detector; and a drive branching unit that branches the rotational drive force of the motor and transfers the branched rotational drive force to the second rotator. It should be noted here that "branch" used in the present specification does not mean "separate" or "divide." To be more specific, even after a rotational drive force branches off using the drive branching unit, the branched force is still the same as the original rotational drive force in strength.

By means of this construction, the rotational drive force of the motor is transferred to the first rotator via the speed reducer while the rotational drive force branched by the drive branching unit is transferred to the second rotator. As such, the rotational drive force can be transferred to a plurality of rotators using only one rotational driving source. This leads to space saving, and the image forming apparatus can be manufactured compact. The rotational speed of the motor is controlled in accordance with the detected rotational speed of the first rotator. Thus, if nonuniformity in rotation occurs to the second rotator, the nonuniformity is prevented from being transferred to the first rotator. As a result, the first rotator is always rotationally driven at a constant speed.

The second object of the present invention can be also achieved by a rotator driving device that drives first and second rotators, the rotator driving device being made up of: a motor that supplies a rotational drive force to the first rotator; and a drive branching unit that branches the rotational drive force, the branched rotational drive force being used for driving the second rotator, wherein the drive branching unit has a main rotating member and a slave rotating member, the main rotating member being set coaxial with the first rotator and so rotating as the first rotator rotates and the slave rotating member being connected to the second rotator and rotating together with the main rotating member owing to a magnetic action exerted between the main and slave rotating members.

With this construction, the rotational drive force can be transferred to a plurality of rotators using only one motor. This leads to space saving and an image forming apparatus including the rotator driving device can be manufactured compact. The drive branching unit is composed of main and slave rotating members, the slave rotating member rotating together with the main rotating member owing to the magnetic action exerted between the main and slave rotating members. By means of this construction of the drive branching unit, nonuniformity in rotation occurring to a rotator can be absorbed more as compared with a case where the rotational drive force branches off using a gear or the like. Consequently, the nonuniformity in rotation can be reliably prevented from adversely affecting another rotator.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings.

DESCRIPTION OF PREFERRED EMBODIMENT

The following is a description of embodiments of an image forming apparatus that includes a rotator driving device of the present invention, with reference to the drawings. In the embodiments, a tandem-type digital color copier (simply referred to as the "copier" hereinafter) is used as an example of such image forming apparatus.

<First Embodiment>

1. Entire Construction of the Copier

Figure 1:
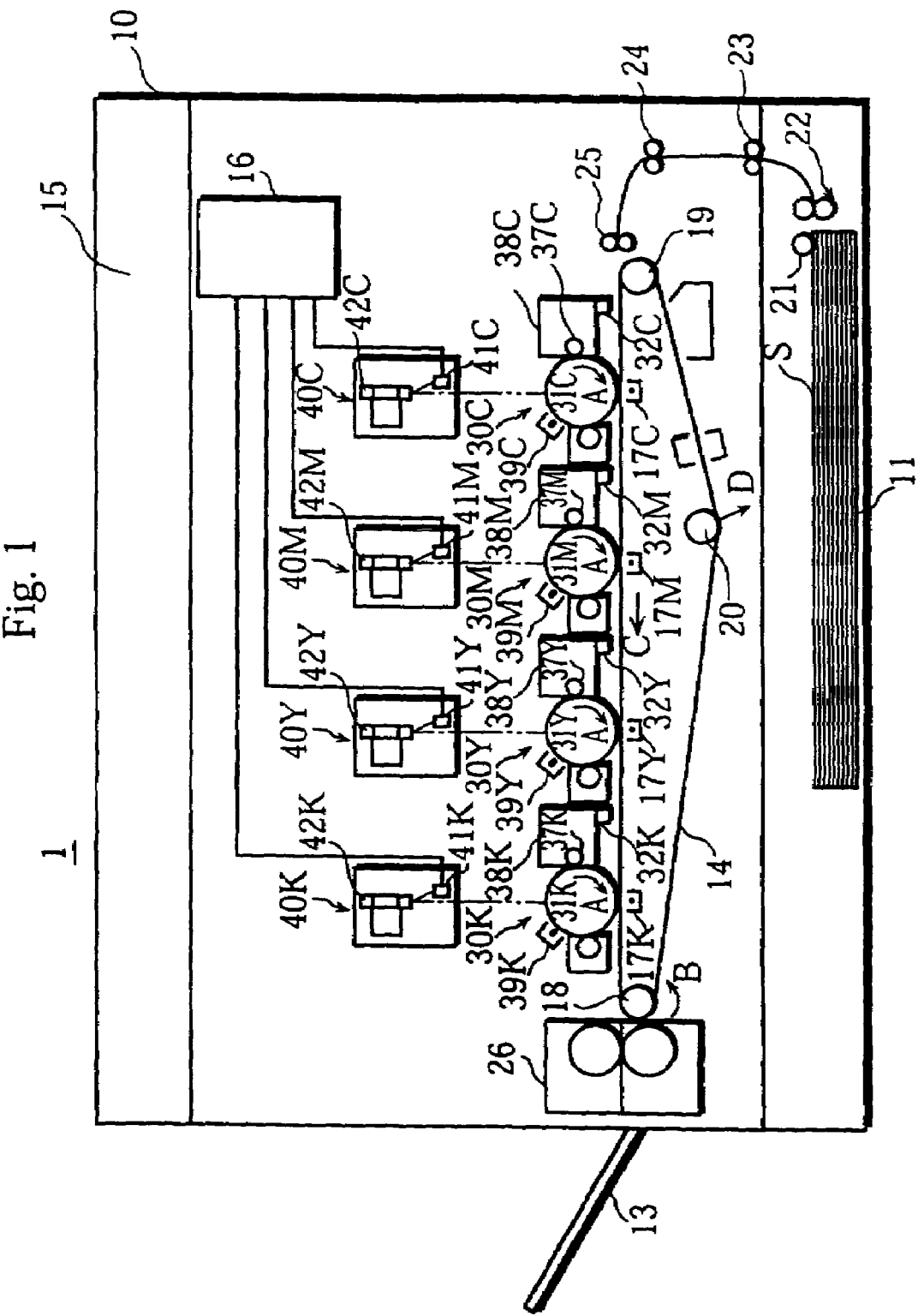
FIG. 1 shows an entire construction of a tandem-type digital color copier of a first embodiment.

FIG. 1 is a cross-sectional view showing the entire construction of a copier 1 of the present embodiment. The copier 1 includes image forming units 30C, 30M, 30Y, and 30K that are set above a transporting belt 14 along its length. The transporting belt 14 is horizontally set in a lower space of an enclosure 10. Below the transporting belt 14, a paper feeding cassette 11 is set at the lowermost position of the enclosure 10 and can be freely slid in and out of the copier 1. A recording sheet S is taken by a pick-up roller 21 from the paper feeding cassette 11 and then carried to the transporting belt 14 by means of transporting rollers 22 to 25. The transporting belt 14 transports the recording sheet S, and the image forming units 30C to 30K sequentially transfer toner images for reproduction colors, i.e. cyan, magenta, yellow, and black, onto the recording sheet S. The toner images are superimposed on the recording sheet S to form a full-color image. The reproduction colors are respectively referred to as C, M, Y, and K hereinafter and components related to these colors are assigned numerals with a corresponding C, M, Y, or K.

The copier 1 further includes an image reading unit 15 at the upper part of the enclosure 10. The image reading unit 15 optically reads image data of an original document using a scanner and linear full-color sensor (CCD sensor) so as to perform photoelectric conversion. Specifically, the image reading unit 15 converts the read image data into electric signals for each of primary colors red (R), green (G), and blue (B). After the conversion, the image reading unit 15 transmits the electric signals as the image data to an image processing unit 16.

The image processing unit 16 performs corrective processes on the image data received from the image reading unit 15 for each of R, G, and B. Following this, the image processing unit 16 separates the image data into gradation data for each reproduction color, C, M, Y, and K, and temporarily stores the gradation data into a memory. Then, the image processing unit 16 reads the data for each reproduction color and converts the data into a driving signal for driving a corresponding laser diode. The driving signals are transferred to optical units 40C to 40K respectively set above the image forming units 30C to 30K.

The optical units 40C to 40K respectively drive the laser diodes in accordance with the driving signals (that is, the image data) transferred from the image processing unit 16. As a result, each laser diode performs light modulation and emits a light-modulated laser beam. By scanning the laser beams across the corresponding surfaces of photosensitive drums 31C to 31K in the main scanning direction, electrostatic latent images are formed on the surfaces of the photosensitive drums 31C to 31K. The optical units 40C to 40K have the same construction and, therefore, an explanation is given only for the optical unit 40C, as one example.

The optical unit 40C is composed of a laser diode 41C, a polygon mirror 42C, an f-θ lens (not illustrated), and redirecting mirrors (not illustrated). The laser diode 41C is driven to perform light modulation in accordance with the driving signal outputted from the image processing unit 16 and emits a light-modulated laser beam. The emitted laser beam is reflected off the polygon mirror 42C that is rotationally driven by a motor (not illustrated), and passes through the f-θ lens. After this, the laser beam is sequentially reflected off the redirecting mirrors and then scans the surface of the photosensitive drum 31C in the main scanning direction.

The image forming units 30C to 30K respectively have the photosensitive drums 31C to 31K as main components that are rotated in the direction of the arrows A. Around the photosensitive drums 31C to 31K, developing units 38C to 38K and sensitizing chargers 39C to 39K are respectively provided. Before the exposure by the laser beam, each of the sensitizing chargers 39C to 39K uniformly charges the corresponding surface of the photosensitive drums 31C to 31K. With this charged state of the photosensitive drums 31C to 31K, the laser beams respectively scan the surfaces of the photosensitive drums 31C to 31K, so that electrostatic latent images are formed on the surfaces of the drums 31C to 31K. The developing units 38C to 38K respectively develop the electrostatic latent images into visible toner images. Accordingly, each of the image forming unit 30C to 30K has a unit construction including the stated components to achieve image formation according to a so-called "electrostatic copying method."

The developing units 38C to 38K are respectively provided with developing rollers 37C to 37K as rotators. The developing rollers 37C to 37K respectively supply the photosensitive drums 31C to 31K with toners C, M, Y, and K provided in the developing units 38C to 38K as developers corresponding to the light-modulated colors of the optical units 40C to 40K.

Transfer chargers 17C to 17K are set underneath the transporting belt 14 at transfer positions located directly under the photosensitive drums 31C to 31K.

The transporting belt 14 runs over a driving roller 18, a slave roller 19, and a tension roller 20. The driving roller 18 is rotationally driven by a motor (not illustrated) in the direction of the arrow B. Together with the rotation of the driving roller 18, the transporting belt 14 moves in the direction of the arrow C. Here, the rotational speed of the motor is controlled so that the moving speed of the transporting belt 14 is equal to the circumferential speed of each photosensitive drum 31C to 31K when image formation is performed. The tension roller 20 is energized in the direction of the arrow D by a tensile spring (not illustrated) and keeps the tension of the transporting belt 14 constant.

With the application of electric fields of the transfer chargers 17C to 17K, the toner images formed on the surfaces of the photosensitive drums 31C to 31K are transferred onto the recording sheet S transported by the transporting belt 14.

After the toner image transfer, the recording sheet S is transported by the transporting belt 14 to a fixing unit 26 which fixes the transferred toner image onto the recording sheet S. Finally, the recording sheet S is discharged onto a discharging tray 13.

Registration sensors 32C to 32K are respectively set before the photosensitive drums 31C to 31K in the transport direction of the recording sheet S as shown in FIG. 1, and detect the leading edge of the recording sheet S which is transported by the transporting belt 14. In accordance with the detection timing, exposure by the laser beam for the corresponding photosensitive drum 31C to 31K is started. Each registration sensor 32C to 32K is set so that a distance between the detection position of the registration sensor and the transfer position of the corresponding photosensitive drum is longer than a circumferential distance of the photosensitive drum between the emitting position of the laser beam and the transfer position measured in the rotational direction of the photosensitive drum.

Figure 2:
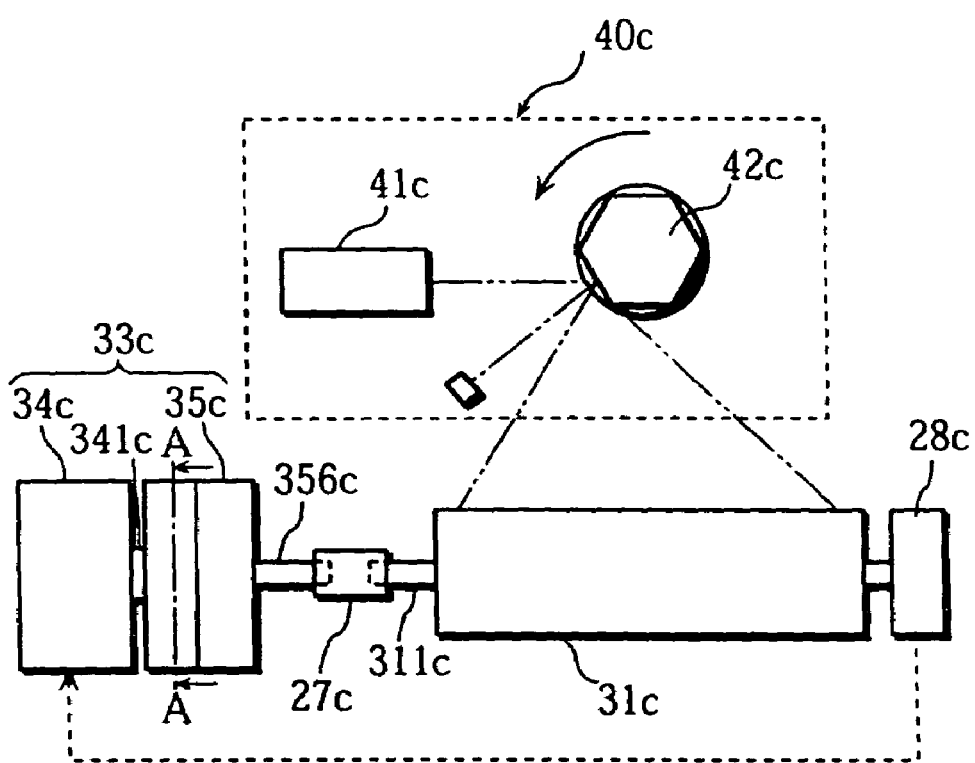
FIG. 2 shows a construction for rotationally driving a photosensitive drum in the first embodiment.
Figure 4:
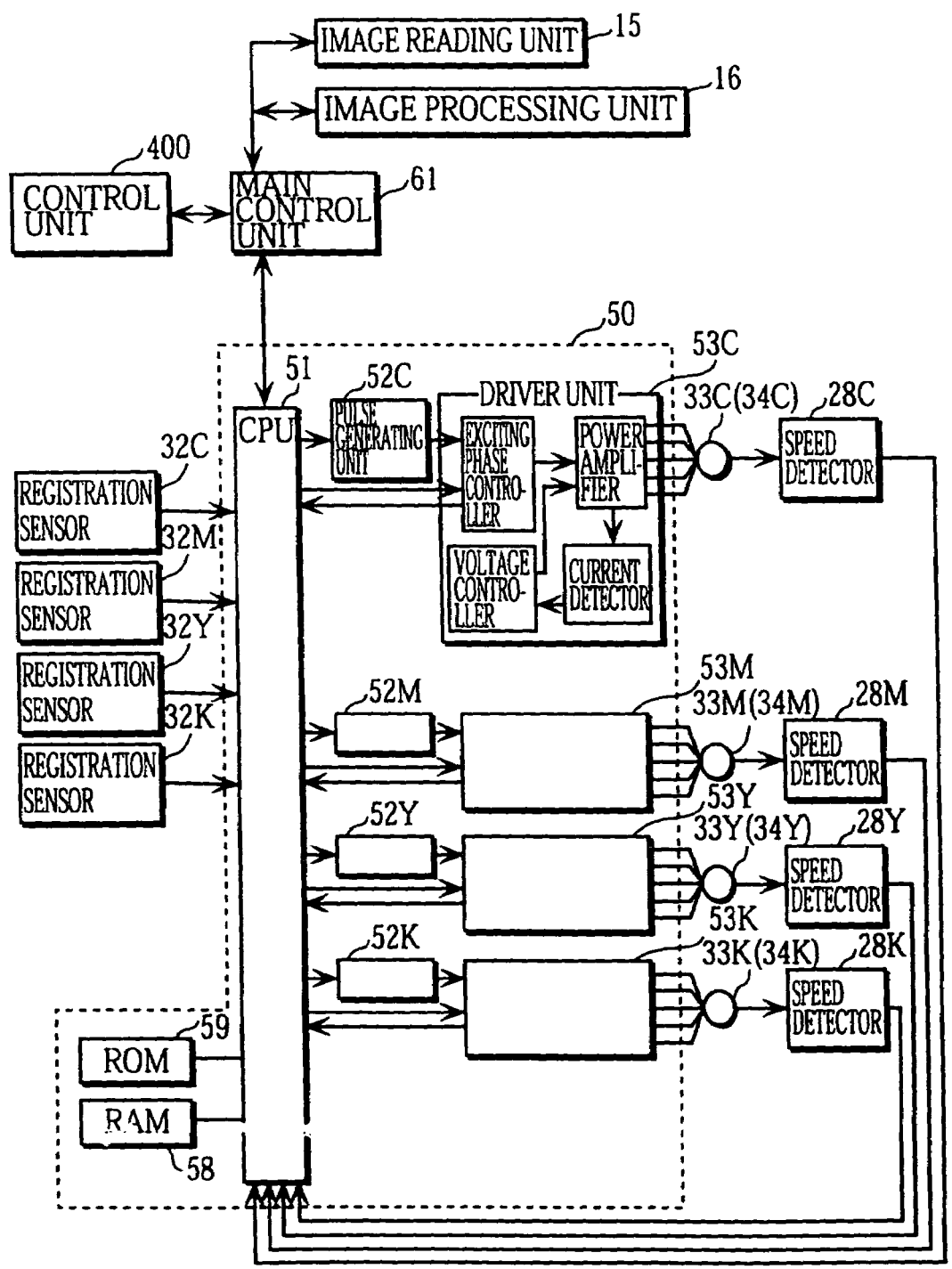
FIG. 4 is a block diagram showing a construction of a rotation control unit of the first embodiment.

The photosensitive drums 31C to 31K are respectively rotationally driven by driving motor units 33C to 33K (see FIGS. 2 and 4). Each driving motor unit 33C to 33K has a reduction device with a planetary roller. Hereinafter, a reduction device with a planetary roller is referred to as the "planetary-roller reduction device."

2. Construction for Rotating the Photosensitive Drums

The copier 1 that reproduces color images using the stated components also has a construction to control the rotational speeds of the photosensitive drums 31C to 31K. With this construction, electrostatic latent images are formed on the surfaces of the drums 31C to 31K with high fidelity. The photosensitive drums 31C to 31K have the same construction and, therefore, the detailed explanation of the construction is given only for the photosensitive drum 31C as one example.

FIG. 2 shows the photosensitive drum 31C and the construction for rotationally driving the drum 31C, and also shows the optical unit 40C. The photosensitive drum 31C is rotationally driven by the driving motor unit 33C. The driving motor unit 33C includes a driving motor 34C and a planetary-roller reduction device 35C.

The driving motor 34C is a stepping motor, and the rotational speed of the driving motor 34C is variably controlled in accordance with a driving pulse inputted into the motor 34C from a rotation control unit 50 (see FIG. 4). The rotation control unit 50 controls each rotation of the photosensitive drums 31C to 31K and will be described in detail later in this specification. The rotational force of the driving motor 34C is transferred to the planetary-roller reduction device 35C by a motor shaft 341C.

The planetary-roller reduction device 35C is a well-known reduction device, and is basically composed of a sun roller, planetary rollers, and a carrier. The planetary rollers are in contact with the outer surface of the sun roller and rotate, and the carrier supports the planetary rollers so that the planetary rollers can smoothly rotate. As the sun roller rotates, the planetary rollers transfer the rotational force of the sun roller to the carrier by friction drive. Here, a desired speed increasing/reducing ratio can be obtained by appropriately arranging the sun roller, the planetary rollers, and the carrier and by adjusting each perimeter of the rollers. As understood from the construction of the reduction device 35C, the rotational force is transferred since the outer surfaces of the rollers are in contact with each other. Thus, the force transfer can be smoothly performed, so that vibration at a high frequency will not occur even when a gearwheel, such as a reduction gear, is used. However, skids may occur to the surfaces of the rollers that are in contact, with each other, meaning that the nonuniformity in rotation at a low frequency will increase.

Figure 3A:
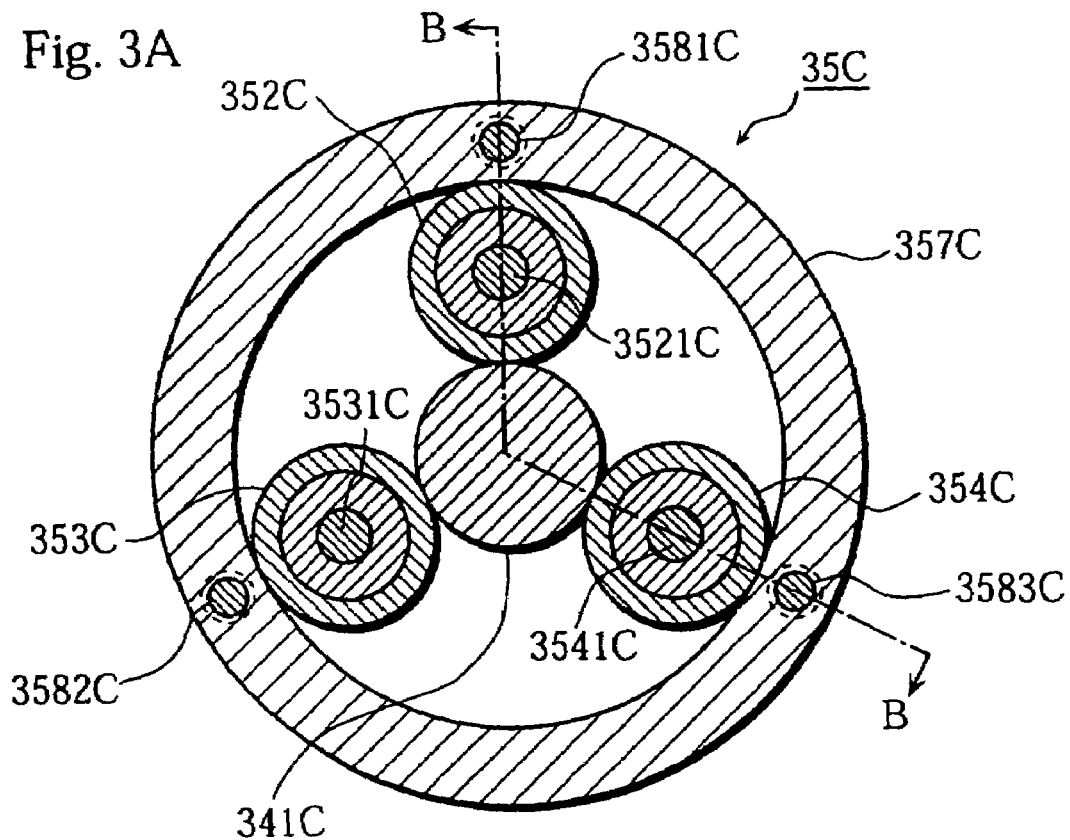
FIG. 3A is a cross-sectional view, taken along the plane of the dot-dash line A—A of FIG. 2, showing a construction of a reduction device with a planetary roller of the first embodiment.
Figure 3B:
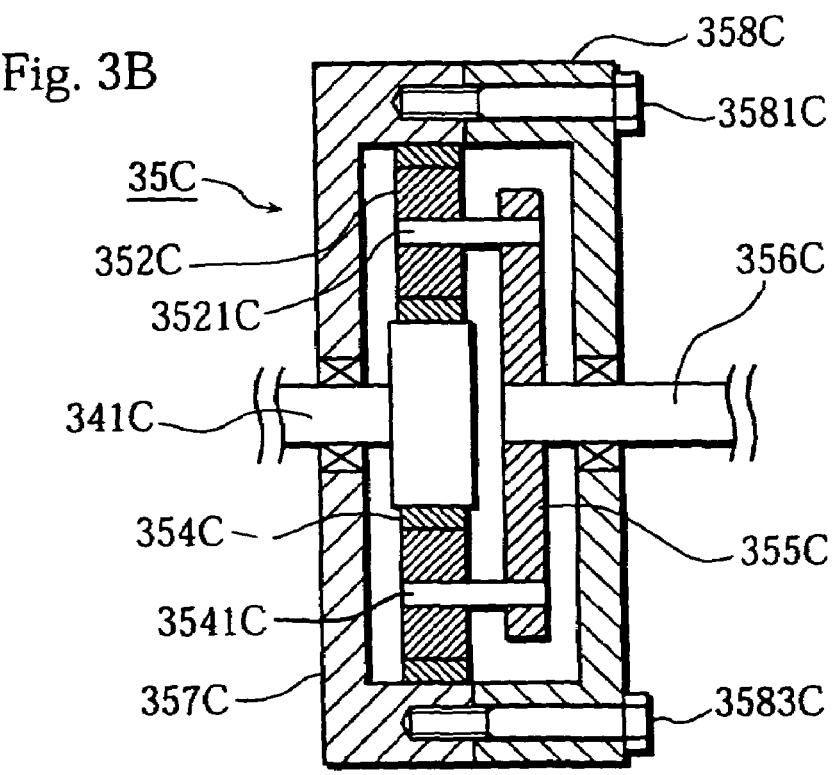
FIG. 3B is a cross-sectional view, taken along the plane of the dot-dash line B—B of FIG. 3A, showing the construction of the reduction device with the planetary roller.

The detailed construction of the planetary-roller reduction device 35C of the present embodiment is explained with reference to FIGS. 3A and 3B. FIG. 3A is a cross-sectional view taken along the plane of the dot-dash line A—A of FIG. 2. FIG. 3B is a cross-sectional view, taken along the plane of the dot-dash line B—B of FIG. 3A, that is viewed in the direction of the arrows.

As shown in FIG. 3A, planetary rollers 352C, 353C, and 354C are provided around the outer surface of the motor shaft 341C that serves as a sun roller. As shown in FIG. 3B, the planetary rollers 352C and 354C are axially supported by axial members 3521C and 3541C that stand on a side of the carrier 355C. Although not illustrated in this figure, the planetary roller 353C is also axially supported by an axial member 3531C. The outer surfaces of the planetary rollers 352C to 354C are in contact with the inner surface of a housing 357C. As the driving motor 34C rotates, each of the planetary rollers 352C to 354C revolves around the motor shaft 341C along the inner surface of the housing 357C, rotating on its axis. Together with these rotations of the rollers 352C to 354C, the carrier 355C that axially supports the rollers 352C to 354C rotates at a speed lower than a speed at which the motor shaft 341C rotates.

Each of the planetary rollers 352C to 354C is formed by covering the outer surface of its metal shaft with elastic material to avoid skids. However, it is impossible to completely prevent skids.

As shown in FIG. 3B, an output shaft 356C for transferring the rotational force of the carrier 355C is provided on the other side of the carrier 355C, opposite to the side on which the axial members 3521C to 3541C stand. The motor shaft 341C, the planetary rollers 352C to 354C, and the carrier 355C are set in the housings 357C and 358C that are secured to each other by screws 3581C, 3582C, and 3583C. The housing 357C is secured to an inner wall of the copier 1 by a supporting member (not illustrated).

In FIG. 2, the output shaft 356C of the carrier 355C is coupled to a rotational shaft 311C of the photosensitive drum 31C via a coupling 27C so that the output shaft 356C can be easily detached/reattached. With this construction, the driving motor 34C rotationally drives the photosensitive drum 31C eventually. By the provision of the coupling 27, the photosensitive drum 31C is removable from the copier 1. Thus, easy maintenance can be achieved by removing the photosensitive drum 31C from the copier 1.

A rotational speed detector 28C is a pulse encoder that is set on the shaft 311C at a position opposite to the driving motor unit 33C, with the photosensitive drum 31C in between them. The rotational speed detector 28C detects the rotational speed of the shaft 311C, and outputs a pulse at a frequency corresponding to the detected rotational speed to the rotation control unit 50. Note that the rotational speed of the shaft 311C refers to the rotational speed of the photosensitive drum 31C. Hereinafter, the pulse outputted from the detector 28C is referred to as the "speed detection signal." As the rotational speed detector 28C, various other types of components, such as a tachometer generator, can be used.

3. Construction of the Rotation Control Unit 50

FIG. 4 is a block diagram showing the construction of the rotation control unit 50.

As shown in FIG. 4, the rotation control unit 50 is composed of a CPU 51, pulse generating units 52C to 52K, driver units 53C to 53K, a RAM 58, and a ROM 59. Aside from the units provided in the rotation control unit 50, a main control unit 61, rotational speed detectors 28C to 28K, and the registration sensors 32C to 32K are also connected to the CPU 51. The main control unit 61 comprehensively controls an operation performed by the entire copier 1. The rotational speed detectors 28C to 28K respectively detect the rotational speeds of the photosensitive drums 31C to 31K. The main control unit 61 is further connected to a control unit 400 that controls the optical units 40C to 40K, the image reading unit 15, and the image processing unit 16.

The components included in the rotation control unit 50 are described as follows. Note that components that are respectively provided for the reproduction colors C, M, Y, and K have the same function, and therefore the description is given only for the components associated with cyan as one example.

The pulse generating unit 52C generates a motor driving pulse that has a cycle corresponding to a frequency outputted from the CPU 51 or a frequency outputted by a crystal oscillator provided in the rotation control unit 50. Then, the pulse generating unit 52C outputs the motor driving pulse to the driver unit 53C.

The driver unit 53C rotationally drives the driving motor 34C at a rotational speed that corresponds to the received motor driving pulse. This means that the rotational speed of the driving motor 34C varies according to on the cycle of the motor driving pulse generated by the pulse generating unit 52C. To be more specific, the rotational speed of the driving motor 34C increases when the cycle of the motor driving pulse is short, while it decreases when the cycle is long. In accordance with an instruction from the CPU 51, the driver unit 53C starts or stops passing a current through the driving motor 34C.

The CPU 51 adjusts the rotational speed of the driving motor 34C in accordance with programs stored in the ROM 59, so that the photosensitive drum 31C is rotated at a desired rotational speed.

Figure 5:
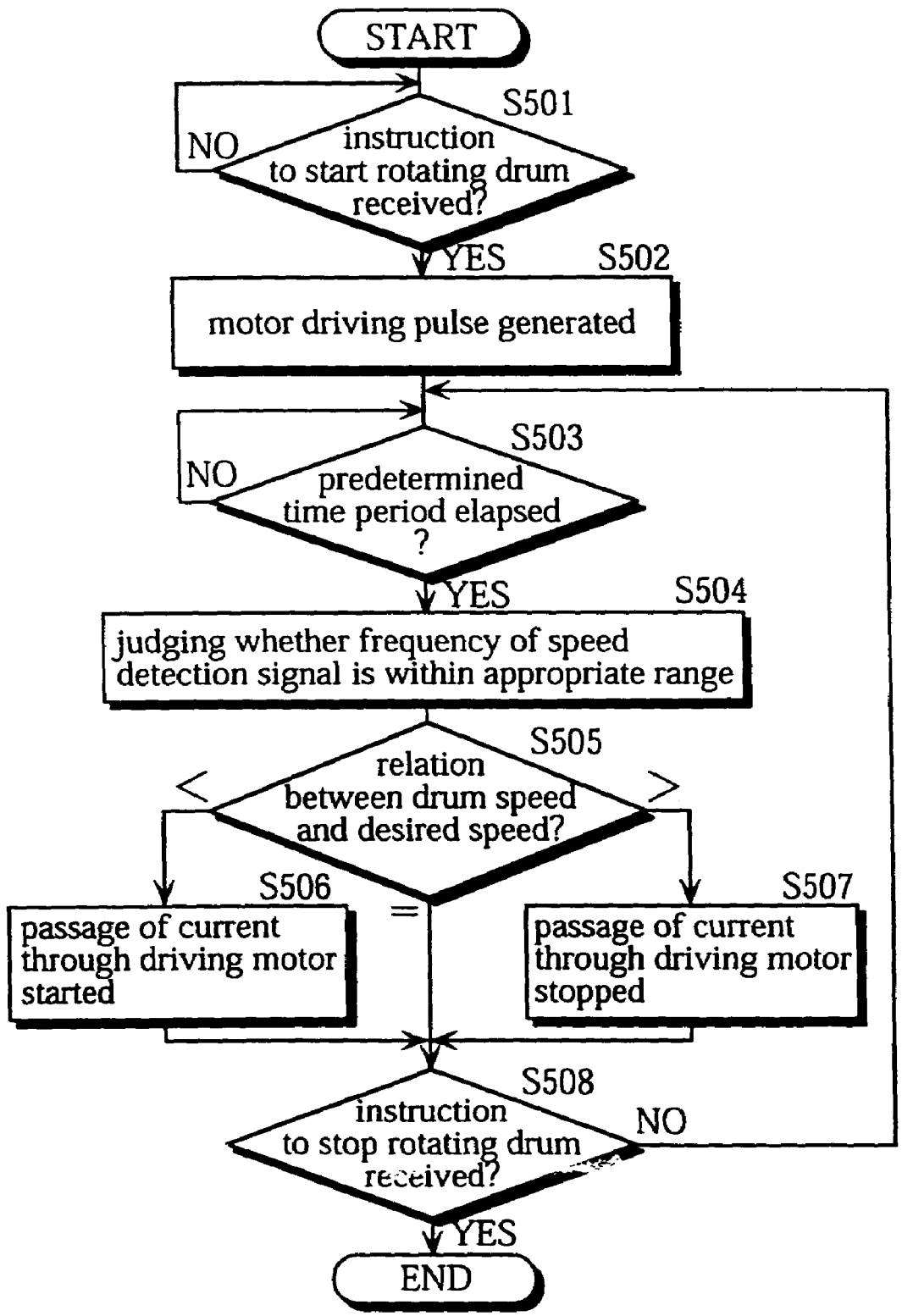
FIG. 5 is a flow chart of an operation performed by a CPU of the rotation control unit for adjusting the rotational speed of a motor.

The adjusting operation performed by the CPU 51 is explained, with reference to the flow chart shown in FIG. 5. FIG. 5 is a flow chart showing the operation performed by the CPU 51 for adjusting the rotational speed of the driving motor 34C.

On receiving an instruction that is issued from the control unit 61 when a user instructs to start a copy operation, the CPU 51 is activated (step S501). The CPU 51 reads an initial value of frequency from the ROM 59 and outputs it to the pulse generating unit 52C. The pulse generating unit 52C generates a motor driving pulse corresponding to the initial value of frequency to rotate the driving motor 34C (step S502). After the driving motor 34C starts rotating, the rotational speed detector 28C sends a speed detection signal to the CPU 51. The speed detection signal indicates the rotational speed of the rotational shaft 311C, i.e. the rotational speed of the photosensitive drum 31C.

The CPU 51 refers to an internal timer and judges whether a predetermined period of time has been elapsed (step S503). If it has ("YES" in step S503), the CPU 51 detects a frequency of the speed detection signal and judges whether the frequency is within an appropriate range that is stored in the ROM 59 beforehand (step S504). This appropriate range includes a predetermined level of tolerance with respect to a frequency of a speed detection signal that is expected to be outputted by the rotational speed detector 28C when the photosensitive drum 31C rotates at a desired speed. This predetermined level of tolerance is properly determined so that the human eye cannot perceive inconsistency in the print density or color displacements on a reproduced image that may occur due to the nonuniformity in rotation. If the frequency value of the speed detection signal exceeds the maximum value of the appropriate range, the CPU 51 judges that the current rotational speed of the photosensitive drum 31C is higher than the desired speed. Meanwhile, if the frequency value of the detection signal is below the minimum value of the appropriate range, the CPU 51 judges that the current rotational speed of the photosensitive drum 31C is lower than the desired speed.

If judging the rotational speed of the drum 31C is higher than the desired speed (">" in step S505), the CPU 51 instructs the driver unit 53C to stop passing the current through the driving motor 34C so that the rotational speed of the driving motor 34C will decrease (step S507). On the contrary, if judging the rotational speed of the drum 31 is lower than the desired speed ("<" in step S505), the CPU 51 instructs the driver unit 53C to start passing the current through the driving motor 34C so that the rotational speed of the driving motor 34C will increase (step S506).

The CPU 51 repeats the stated processes (steps S503 to S507) until receiving an instruction from the main control unit 61 to stop rotating the photosensitive drum 31C. On receiving the instruction ("YES" in step S508), the CPU 51 terminates this processing.

As clearly understood from the above explanation, for the copier 1 of the present embodiment, the nonuniformity in rotation at a high frequency can be reduced using the planetary-roller reduction device. At the same time, the nonuniformity in rotation at a low frequency that increases because of the provision of the planetary-roller reduction device can be reduced through the feedback control on the rotational speed of the driving motor using the rotational speed detector. The feedback control is more suitable for the solution of the nonuniformity in rotation at a low frequency than the nonuniformity in rotation at a high frequency. By taking two different measures against the nonuniformity in rotation at high and low frequencies, these two different types of nonuniformity in rotation can be effectively reduced. Consequently, each photosensitive drum 31C to 31K rotates at a constant speed and nonuniformity will not occur in the distances between the scanning lines in the sub-scanning direction. As a result, a color image without color displacements can be reproduced.

In the present embodiment, the rotational speed detector 28C is set on the shaft 311C at the position opposite to the driving motor unit 33C, with the photosensitive drum 31C in between them. Each setting position of the rotational speed detectors 28C to 28K is not limited to this position.

Figure 6A:
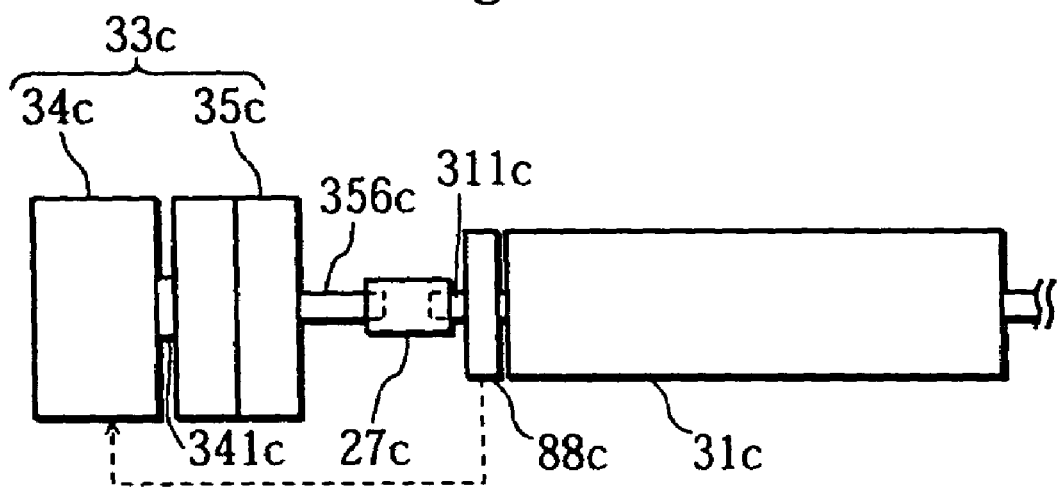
FIGS. 6A and 6B show examples of a setting position of a rotational speed detector, aside from the position described in the first embodiment.
Figure 6B:
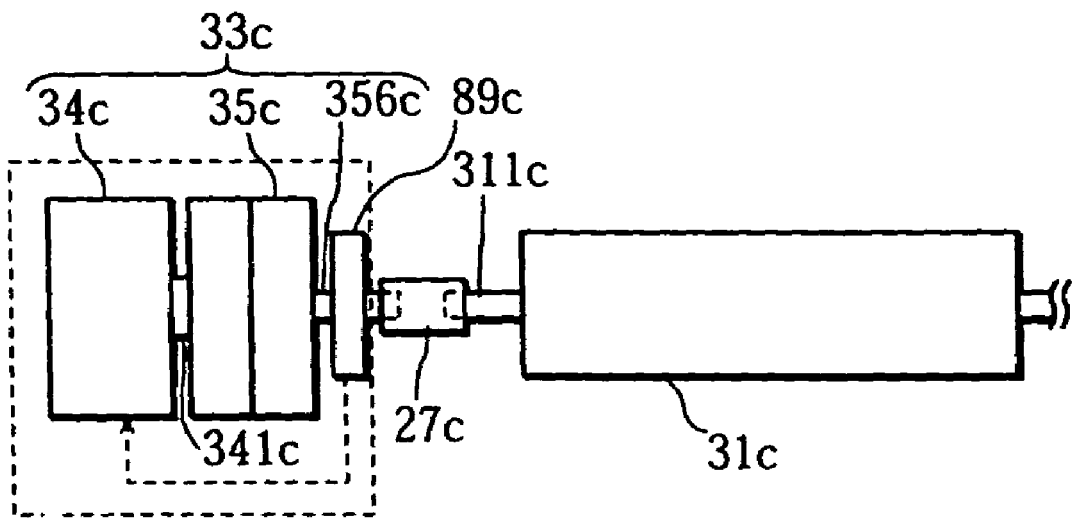

FIGS. 6A and 6B each show an example of a setting position of the rotational speed detectors 28C to 28K, aside from the position shown in FIG. 2. Note that both FIGS. 6A and 6B show the examples only for the components associated with cyan as one example.

In FIG. 6A, a rotational speed detector 88C is set on the shaft 311C of the photosensitive drum 31C and located between the coupling 27C and the body of the photosensitive drum 31C. In FIG. 6B, a rotational speed detector 89C serves as a part of the driving motor unit 33C and is set on the output shaft 356C of the planetary-roller reduction device 35C. The detector 89C is located at the upstream side of the coupling 27C in the transfer direction in which the rotational force of the driving motor 34C is transferred. In the case shown in FIG. 6B, after the photosensitive drum 31 is removed from the copier 1, the rotational speed detector 89C will remain on the output shaft (356C) side.

However, in the case shown in FIG. 6B, nonuniformity in rotation caused by torsion of the output shaft 356C and the shaft 311C at the coupling 27C cannot be detected. For this reason, if the rotational speed detector 89C is set at the position as shown in FIG. 6B, such nonuniformity in rotation due to the torsion needs to be prevented through appropriate measures, such as enlarging each diameter of the output shaft 356C and the shaft 311C.

In the present embodiment, a frequency of a speed detection signal is referred so as to detect the rotational speed of the rotator (i.e. the photosensitive drum). Here, the control on the rotational speed of the rotator can be achieved with a higher degree of precision by referring to both a frequency and a phase of the speed detection signal.

In the present embodiment, an explanation has been given for a case where a stepping motor is used as a driving source of the rotator. However, the present invention can be applied to cases where other kinds of motor, such as a DC motor, is used.

In the present embodiment, the rotational speed of the driving motor 34C is adjusted to a desired speed by starting and stopping the passage of current through the driving motor 34C. However, the rotational speed of the driving motor 34C may be adjusted by changing a cycle of the motor driving pulse.

<Second Embodiment>

In the first embodiment, the photosensitive drums 31C to 31K are rotationally driven using the planetary-roller reduction devices. In the second embodiment, a photosensitive drum and a developing roller are rotationally driven using one driving motor. Note that a copier of the present embodiment is the same as the copier 1 of the first embodiment, except for a rotator driving device used for rotationally driving the photosensitive drum and the developing roller. Therefore, the explanation for the same components of the copiers is omitted in the present embodiment. These same components are assigned the same numerals as in the first embodiment.

Figure 7:
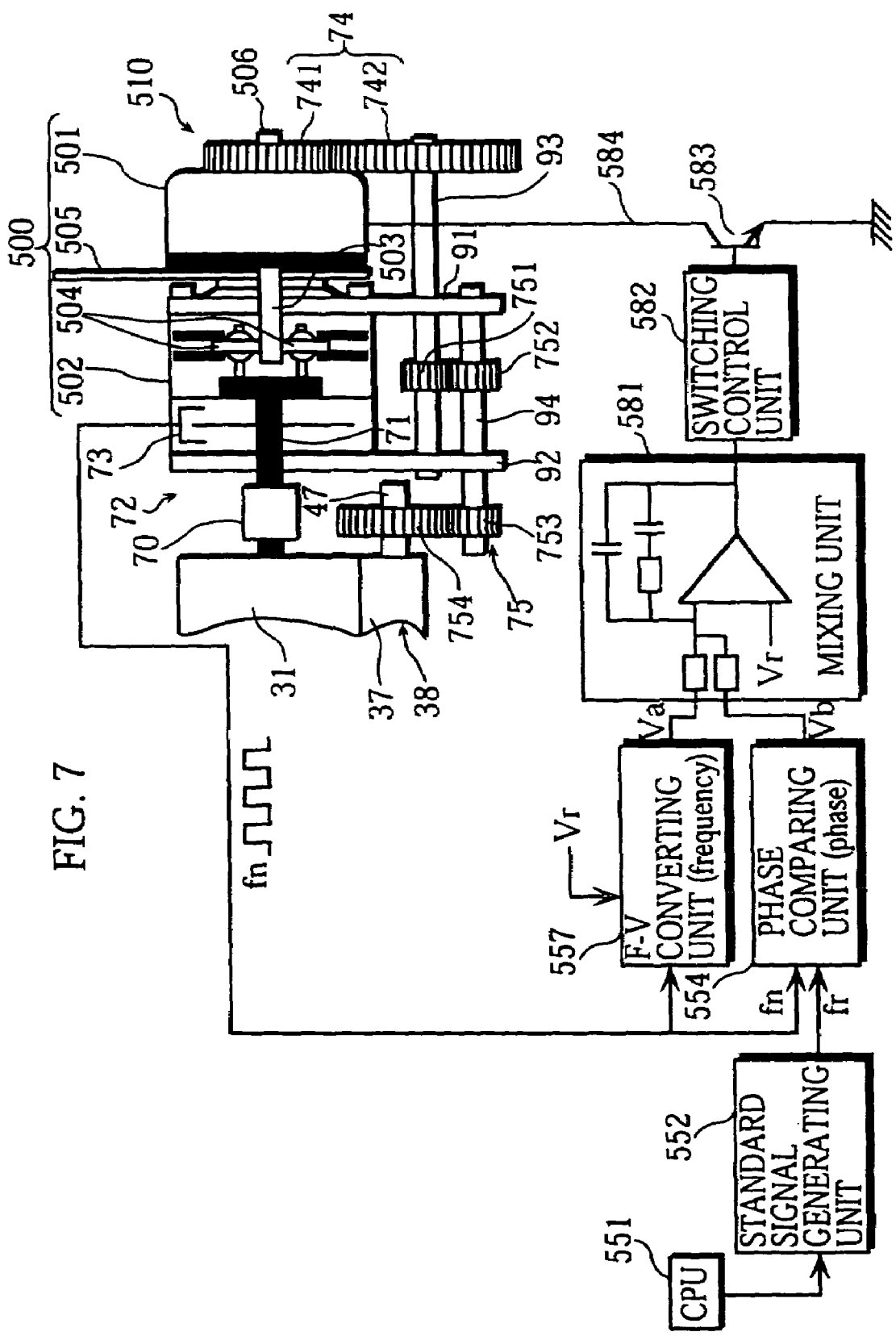
FIG. 7 shows a construction of a rotator driving device of a second embodiment.

FIG. 7 shows a construction of a driving device 510 for rotationally driving the rotators, i.e. the photosensitive drum and the developing roller of the developing unit. This figure also diagrammatically shows a circuit construction for rotationally driving a driving motor 501. The driving device 510 is provided for each pair of a photosensitive drum and a developing unit, meaning that four driving devices 510 are provided in the copier 1 of the present embodiment. As such, in FIG. 7, the components are assigned numerals without C, M, Y, or K.

A driving motor unit 500 is composed of a driving motor 501 that is a rotator-driving source and a planetary-roller reduction device 502. A control board 505, on which circuit components are contained beforehand, is fixed between the driving motor 501 and the planetary-roller reduction device 502.

As the driving motor 501, a stepping motor, AC motor, DC motor, or servomotor can be used. In the present embodiment, a DC motor is used.

An output shaft 503 of the driving motor 501 serves as a sun roller. Three planetary rollers 504 (only two rollers 504 are shown in FIG. 7) are in contact with the outer surface of the output shaft 503. Each planetary roller 504 revolves around the output shaft 503, rotating on its axis. An output shaft 71 supports the planetary rollers 504 at its bottom end in such a manner that the rollers 504 can freely rotate. The top end of the output shaft 71 serves as a final output shaft that transfers force from the driving motor unit 500.

The reduction device of the present embodiment is not limited to the planetary-roller reduction device 502. For example, a reduction gear mechanism or a belt transmission mechanism may be employed for the reduction device.

The top end of the output shaft 71 is connected to the photosensitive drum 31 via a coupling 70, so that the rotational force of the driving motor 501 is transferred to the photosensitive drum 31. The coupling 70, the planetary-roller reduction device 502, and the output shaft 71 comprise a first drive transfer unit 72.

The output shaft 71 is provided with a speed detector 73 for detecting the rotational speed of the output shaft 71. The speed detector 73 corresponds to the rotational speed detector 28C (or, 28M to 28K) described in the first embodiment.

As the speed detector 73, various types of components, such as a pulse encoder or tachometer generator, can be used. In the present embodiment, a pulse encoder is used. Also, a position at which the speed detector 73 detects the rotational speed of the output shaft 71 may be freely set.

Since a pulse encoder is used as the speed detector 73 in the present embodiment, the speed detection signal would be a detection pulse signal fn shown as a rectangular wave in FIG. 2. The detection pulse signal fn is inputted into a phase comparing unit 554, into which a standard signal fr is also inputted from a standard signal generating unit 552. The frequency of the standard signal fr is the same as a frequency of a detection pulse signal that is expected to be outputted by the speed detector 73 when the photosensitive drum 31 rotates at a predetermined speed. According to an instruction given by a CPU 551, the standard signal generating unit 552 outputs the standard signal fr.

The phase comparing unit 554 converts a phase difference between the standard signal fr and the detection pulse signal fn into a voltage value Vb. Meanwhile, the detection pulse signal fn is converted into a voltage value Va by a frequency-voltage (F-V) converting unit 557, into which a standard voltage value Vr related to the standard signal fr is inputted.

A mixing unit 581 includes an integrator circuit using an operational amplifier. The output voltage values Va and Vb are inputted to one input terminal of the operational amplifier provided in the mixing unit 581. The standard voltage value Vr is inputted to the other input terminal of the operational amplifier. An output voltage from the mixing unit 581 varies in accordance with fluctuations in a difference of the frequency and phase of the detection pulse signal fn with respect to the standard signal fr. More specifically, the output voltage from the mixing unit 581 depends on a difference between the value Vr and a value calculated by Va+Vb (this addition value is referred to as "Vc" hereinafter). It should be noted here that the value Vc becomes equal to the voltage value Vr when the photosensitive drum 31 rotates at the predetermined speed. When the current rotational speed of the photosensitive drum 31 is lower than the predetermined speed, a relation of the values Vc and Vr is expressed as Vc<Vr. When the current rotational speed of the drum 31 is higher than the predetermined speed, the relation is expressed as Vr<Vc.

A switching control unit 582 sets an ON/OFF duty factor that is referred to for turning ON or OFF a switching element 583 in accordance with the output voltage from the mixing unit 581. Hereinafter, a factor representing a period of time during which the switching element 583 is turned ON is referred to as the "ON factor." Based on the ON/OFF duty factor, the switching control unit 582 controls the switching element 583. The switching element 583 is inserted into a power supplying line 584 that is connected to the driving motor 501. Note that the driving motor 501 is in turn connected to a power source (not illustrated). When the switching element 583 is turned ON, a current passes through the power supplying line 584, so that the driving motor 501 is rotationally driven. Hence, when the ON factor that has been set for the switching element 583 by the switching control unit 582 is relatively great, the rotational speed of the driving motor 501 is high.

Suppose that the current relation is detected as Vc<Vr based on the output voltage from the mixing unit 581. In this case, the switching control unit 582 sets the ON factor of the switching element 583 greater than the current factor in order to increase the rotational speed of the photosensitive drum 31. Suppose, on the other hand, that the current relation is detected as Vr<Vc. In this case, the switching control unit 582 sets the ON factor smaller than the current factor in order to decrease the rotational speed of the photosensitive drum 31.

In the present embodiment, a DC motor is used as the driving motor 501. If a stepping motor is used as in the case of the first embodiment, the driver unit 53C (or, 53M to 53K) shown in FIG. 4 can be used as a driving circuit for driving the stepping motor used as the driving motor 501.

In addition to the output shaft 503, the driving motor 501 is further provided with a rotational shaft 506 that rotates together with the output shaft 503 about the same axis and extends opposite in direction to the output shaft 503, as shown in FIG. 7. The rotational shaft 506 is connected to a second drive transfer unit 75 via a drive branching unit 74. The rotational force of the rotational shaft 506 is transferred as a branched rotational force to the developing roller 37 via the drive branching unit 74 and the second drive transfer unit 75. It should be noted here that "branch" used in the present specification does not mean "separate" or "divide." To be more specific, even after a rotational force branches off at the drive branching unit, the branched force (that is to be transferred to the developing roller 37 in the present embodiment) is still the same as the original rotational force in strength.

The drive branching unit 74 is composed of a drive gear 741 and a reduction gear 742 to form a reduction gear mechanism. The drive gear 741 is fixed to the rotational shaft 506. The reduction gear 742 meshes with the drive gear 741 and is fixed to one end of a first transmission shaft 93. As shown in FIG. 7, the first and second transmission shafts 93 and 94 are supported by a pair of shaft bearing members 91 and 92 in such a manner that the transmission shafts 93 and 94 freely rotate.

It should be note here that the construction of the drive branching unit 74 is not limited to the reduction gear mechanism, and that other kinds of mechanisms can be employed. For example, a belt or chain transmission mechanism can be employed.

The second drive transfer unit 75 is composed of first to third intermediate gears 751 to 753 and a slave gear 754. The first intermediate gear 751 is fixed to the first transmission shaft 93, and the second intermediate gear 752 is fixed to one end of the second transmission shaft 94 and meshes with the first intermediate gear 751. The third intermediate gear 753 is fixed to the other end of the second transmission shaft 94, and the slave gear 754 is fixed to a shaft 47 of the developing roller 37 and meshes with the third intermediate gear 753.

As is the case with the drive branching unit 74, the construction of the second drive transfer unit 75 is not limited to the reduction gear mechanism, and other kinds of mechanism, such as a belt or chain transmission mechanism, can be employed.

With the stated construction of the driving system, the rotational force of the output shaft 503 of the driving motor 501 is decelerated by the planetary-roller reduction device 502 and transferred to the photosensitive drum 31 at a high torque via the output shaft 71 and the coupling 70.

Meanwhile, the branched rotational force from the rotational shaft 506 is transferred to the shaft 47 of the developing roller 37 at a high torque via the second drive transfer unit 75. As a result, the developing roller 37 is rotationally driven.

Accordingly, the photosensitive drum 31 and the developing roller 37 do not have to be driven by separate motors. Both the drum 31 and the roller 37 can be driven by one motor, the driving motor 501, that is serving as the rotator driving source. Consequently, space for setting the driving motor 501 can be saved as compared with a case where the photosensitive drum 31 and the developing roller 37 are driven by separate motors.

The rotational speed of the output shaft 71, i.e. the rotational speed of the photosensitive drum 31, is detected by the speed detector 73. In accordance with the detected rotational speed, the feedback control is performed on the driving motor 501, so that even when nonuniformity in rotation occurs to the developing roller 37, the nonuniformity is prevented from being directly transferred to the photosensitive drum 31. Therefore, the photosensitive drum 31 is rotationally driven at a constant speed.

Particularly in the present embodiment, the rotational force of the photosensitive drum 31 is not directly transferred to the developing roller 37 and vice versa, since the planetary-roller reduction device 502 is set in a force transfer path between the photosensitive drum 31 and the developing roller 37. Suppose that load fluctuations, such as vibration, occur to the developing unit 38 or that noise as load fluctuations occurs to the driving branching unit 74 due to improper engagement of the gears 741 and 742. In such a case, the load fluctuations are attenuated owing to the transfer characteristic of the planetary-roller reduction device 502, so that the photosensitive drum 31 can be effectively prevented from being adversely affected by the load fluctuations.

Figure 8:
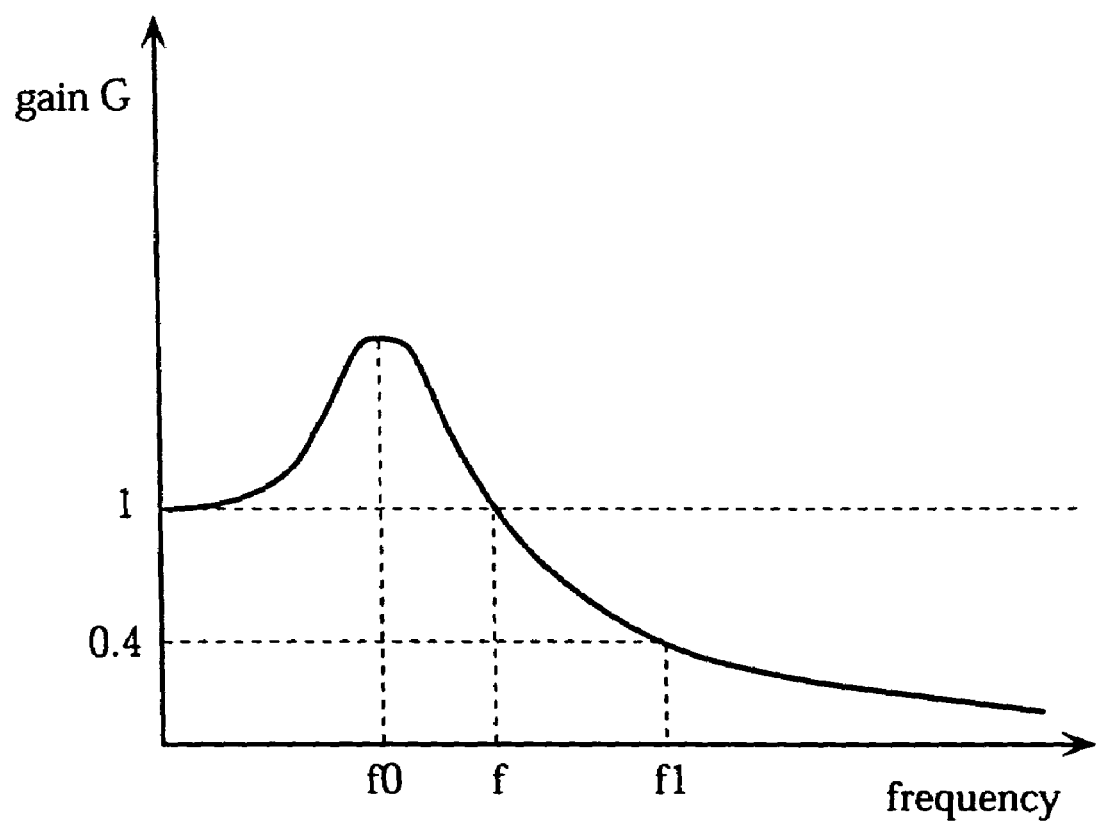
FIG. 8 is a graph showing a transfer characteristic of a reduction device provided in the reduction device with a planetary roller shown in FIG. 7.

FIG. 8 is a graph showing the transfer characteristic of the planetary-roller reduction device 502. This transfer characteristic can be obtained beforehand by calculating a gain G of output noise from the planetary-roller reduction device 502, the output noise resulting from input noise from the driving motor 501 serving as the rotator driving source. The gain G is calculated by dividing the output noise by the input noise. In accordance with this transfer characteristic of the planetary-roller reduction device 502, a frequency of the load fluctuations applied to the planetary-roller reduction device 502 is set so that a value of the gain G remains below 1.

When a frequency f1 of the load fluctuations occurring to the developing unit 38 is set within a frequency range in which the gain G is equal to 1, the output noise from the planetary-roller reduction device 502 is almost the same as the input noise from the driving motor 501. Meanwhile, when the frequency f1 is set within a frequency range in which the gain G is greater than 1, the output noise from the reduction device 502 is greater than the input noise from the driving motor 501. In these two cases, the load fluctuations occurring to the developing unit 38 are transferred to the photosensitive drum 31 via the planetary-roller reduction device 502 and so adversely affect the rotation of the photosensitive drum 31. This may lead to nonuniformity in rotation and interfere with forming an excellent image.

Meanwhile, suppose that the frequency f1 is set within a frequency range in which the gain G is smaller than 1, such as G=0.4, that is, the frequency f1 is set higher than a frequency f shown in FIG. 8. In this case, the transfer of the load fluctuations occurring to the developing unit 38 can be attenuated. Thus, the rotation of the photosensitive drum 31 is less prone to the load fluctuations, so that a reproduced image with high quality can be ensured.

When the frequency f1 is fixed, a resonance frequency f0 may be variably controlled using a flywheel or the like. Then, the frequency f1 is set within a frequency range where the gain G is smaller than 1.

In the present embodiment, the rotational force of the rotational shaft 506 of the driving motor 501 is transferred to the developing roller 37. For this transfer of force, space provided on the rotational shaft (506) side of the driving motor 501 is used for setting the drive branching unit 74. In this way, design flexibility can be increased in the case of the construction explained in the present embodiment.

It should be obvious that branching of the rotational force from the driving motor 501 to the developing roller 37 can be performed between the planetary-roller reduction device 502 and the driving motor 501. The force branch at this position can also achieve the stated attenuation effect on the load fluctuations by means of the planetary-roller reduction device 502. For the attenuation effect, the drive branching unit 74 may be set on the upstream side of the planetary-roller reduction device 502 in the direction in which the rotational force of the driving motor 501 is transferred.

Figure 9:
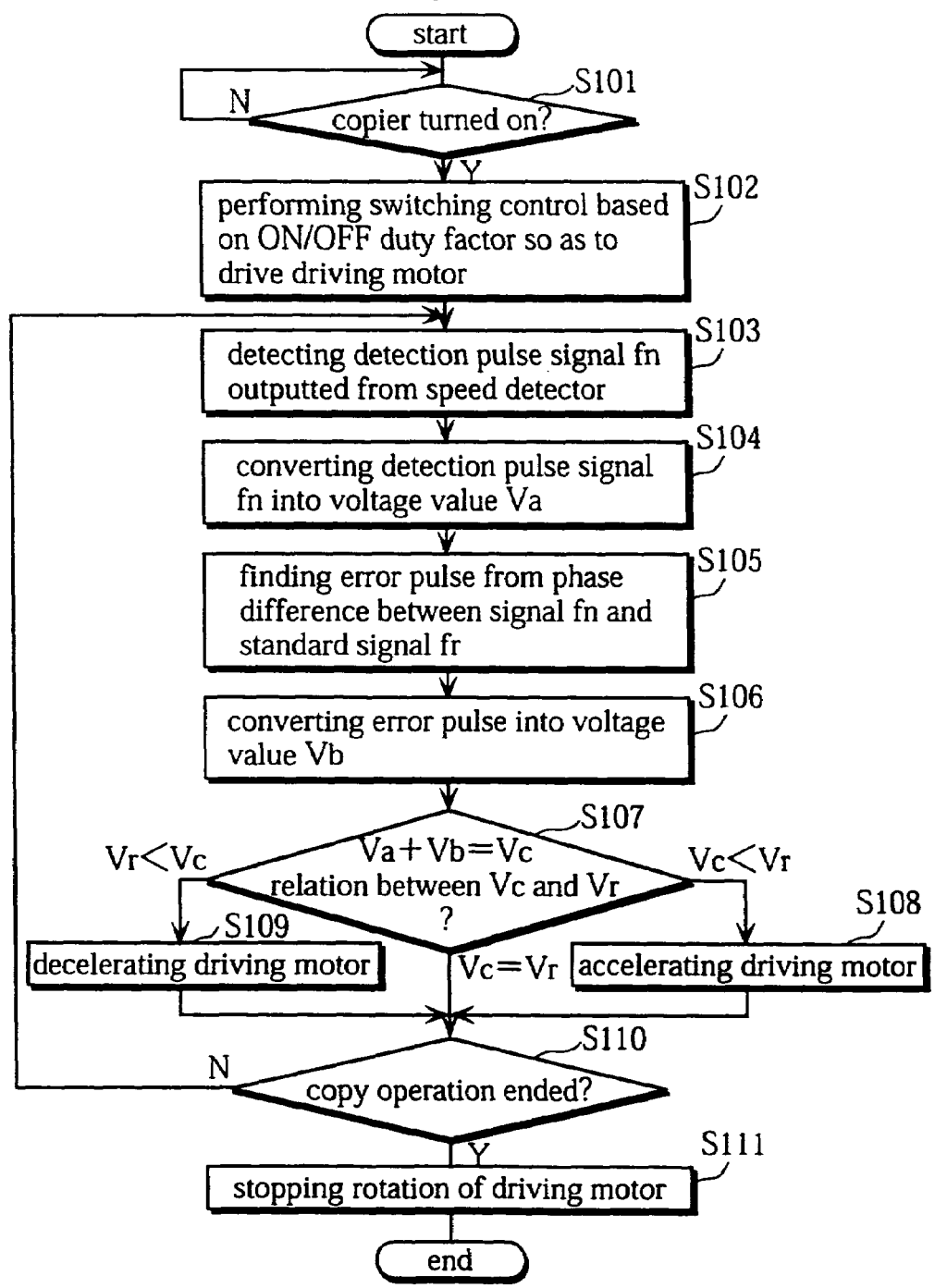
FIG. 9 is a flow chart of an operation performed for adjusting the rotational speed of a motor provided in the rotator driving device shown in FIG. 7.

FIG. 9 is a flow chart of the feedback control performed by each driving motor unit 500 (that is, 500C to 500K).

When the copier 1 is turned on ("Y" in step S101), the CPU 551 instructs the standard signal generating unit 552 to generate the standard signal fr and has the switching control unit 582 perform the switching control on the driving motor 501 in accordance with the set ON/OFF duty factor so as to drive the driving motor 501 (step S102). As stated earlier, the set ON/OFF duty factor has been set beforehand for the switching control to be first performed when the driving motor 501 is driven.

Then, the detection pulse signal fn outputted from the speed detector 73 is detected (step S103). This detection pulse signal fn is converted into a voltage value Va by the F-V converting unit 557 (step S104). Following this, the phase comparing unit 554 compares the phase of the standard signal fr and that of the detection pulse signal fn, and a phase difference is found as an error pulse (step S105). The phase comparing unit 554 then converts this error pulse into a voltage value Vb (step S106).

After this, the switching control unit 582 performs the switching control in the following steps S107 to S109, depending on the current relation between the value Vc (=Va+Vb) and the standard voltage value Vr.

As stated above, when the current relation is expressed as Vc<Vr in step S107, the switching control unit 582 increases the ON factor of the switching element 583 to accelerate the driving motor 501 so that the rotational speed of the photosensitive drum 31 increases (step S108). Then, the processing proceeds to step S110. Meanwhile, when the current relation is expressed as Vr<Vc in step S107, the switching control unit 582 decreases the ON factor of the switching element 583 to decelerate the driving motor 501 so that the rotational speed of the drum 31 decreases (step S109). Then the processing proceeds to step S110.

When the current relation is expressed as Vc=Vr in step S107, the photosensitive drum 31 is judged to be rotating at the predetermined rotational speed. In this case, the amount of current passing through the driving motor 501 does not need to be changed. Thus, the processing proceeds to step S110, the current state of the switching control by the switching control unit 582 being maintained.

The CPU 551 judges in step S110 whether the copy operation has ended. If not ("N" in step S110), the CPU 551 returns to step S103. The processes from steps S103 to S110 are repeated, so that the photosensitive drum 31 is kept rotating at the predetermined rotational speed.

If judging that the copy operation has ended ("Y" in step S110), the CPU 551 instructs the standard signal generating unit 552 to stop generating the standard signal fr and also instructs the switching control unit 582 to stop the switching control so as to stop the rotation of the driving motor 501 (step S111).

In the present embodiment, differences in frequency and phase between the standard signal and the detection pulse signal are detected. It should be noted here that the rotational speed of the motor can be controlled in accordance with only a difference in frequency between the standard signal and the detection pulse signal as is the case with the first embodiment.

<Third Embodiment>

In the second embodiment, the reduction gear mechanism is employed for the branching unit that transfers the rotational force of the driving motor 501 to both the photosensitive drum 31 and the developing roller 37. In the third embodiment, a magnetic linking mechanism using inner and outer magnetic rotators is employed for a branching unit. The magnetic linking mechanism is explained below. Note that a copier of the present embodiment is the same as the copier 1 of the second embodiment, except for the construction of the branching unit. Therefore, the explanation for the same components of the copiers is omitted in the present embodiment.

Figure 10:
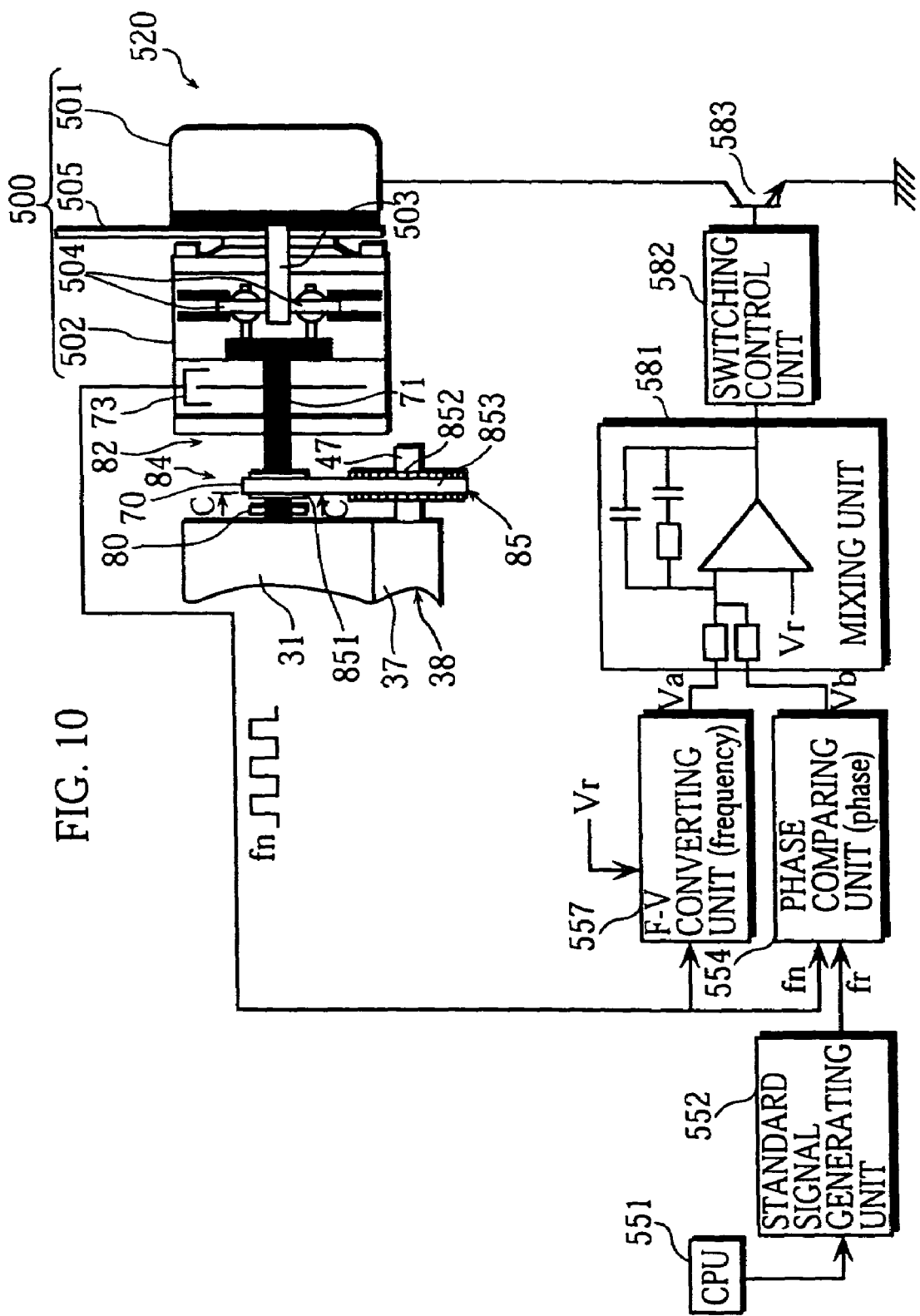
FIG. 10 shows a construction of a rotator driving device of a third embodiment.

FIG. 10 shows a construction of a driving device 520 of the present embodiment. The driving device 520 is provided for each pair of a photosensitive drum and a developing unit, meaning that four driving device 520 are provided in the copier of the present embodiment. Therefore, in FIG. 10, the components are assigned numerals without C, M, Y, or K. The same components as described in the preceding embodiments are assigned the same numerals in the present embodiment.

As shown in FIG. 10, the driving device 520 is composed of a driving motor unit 500 having a planetary-roller reduction device, a first drive transfer unit 82, a drive branching unit 84, and a second drive transfer unit 85. The first drive transfer unit 82 transfers the rotational force of the driving motor unit 500 to the photosensitive drum 31. The drive branching unit 84 is used for branching the rotational force of the driving motor unit 500. The second drive transfer unit 85 transfers the branched rotational force to the developing roller 37.

The top end of the output shaft 71 of the driving motor unit 500 is connected to the photosensitive drum 31 via a coupling 80, so that the rotational force of the driving motor 501 is transferred to the photosensitive drum 31. The coupling 80, the planetary-roller reduction device 502, and the output shaft 71 comprise the first drive transfer unit 82.

The rotational force of the output shaft 71 branches using the drive branching unit 84 and the branched rotational force is transferred to the developing roller 37 via the second drive transfer unit 85.

Figure 11:
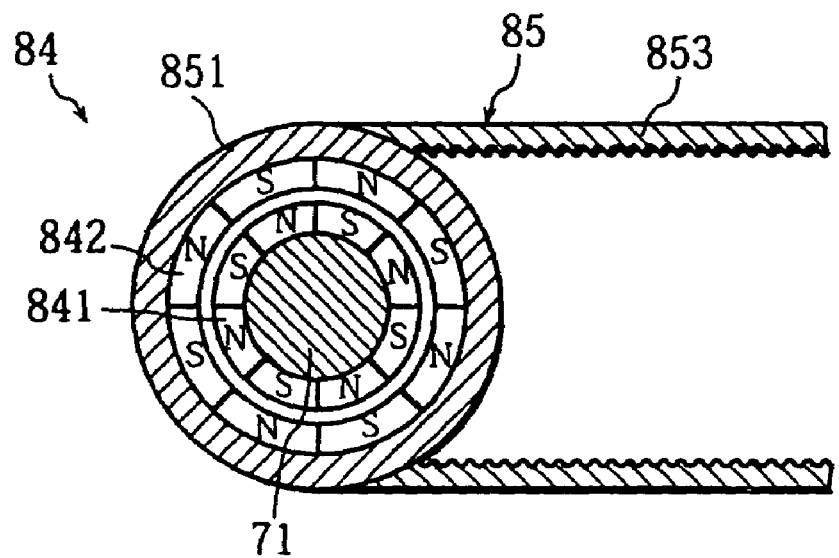
FIG. 11 is a cross-sectional view, taken along the plane of the line C—C of FIG. 10, showing a drive branching unit provided in the rotator driving device.

FIG. 11 is a cross-sectional view, taken along the plane of the line C—C of FIG. 10, showing the construction of the drive branching unit 84 viewed in the direction of the arrows indicated next to the line C—C. As shown in FIG. 11, the drive branching unit 84 is composed of an inner magnetic ring 841 fixed to the output shaft 71 serving as the main rotator and an outer magnetic ring 842 fixed inside a driving pulley 851 serving as the slave rotator. The inner magnetic ring 841 has a plurality of alternating north and south poles that are set in the direction of rotation along the outer surface of the output shaft 71. The outer magnetic ring 842 also has a plurality of alternating north and south poles set in the direction of rotation along the inner surface of the driving pulley 851, and is set facing but not in contact with the outer surface of the inner magnetic ring 841. As can be understood, magnetic linking force acts between the inner and outer magnetic rings 841 and 842 due to the magnetic attraction between the opposite poles. As the output shaft 71 rotates, the inner magnetic ring 841 fixed to the output shaft 71 also rotates. Together with the rotation of the inner magnetic ring 841, the outer magnetic ring 842 rotates and so does the driving pulley 851. It is preferable that the magnetic poles of the magnetic ring 841 or 842 are set with the same pitch.

Figure 12:
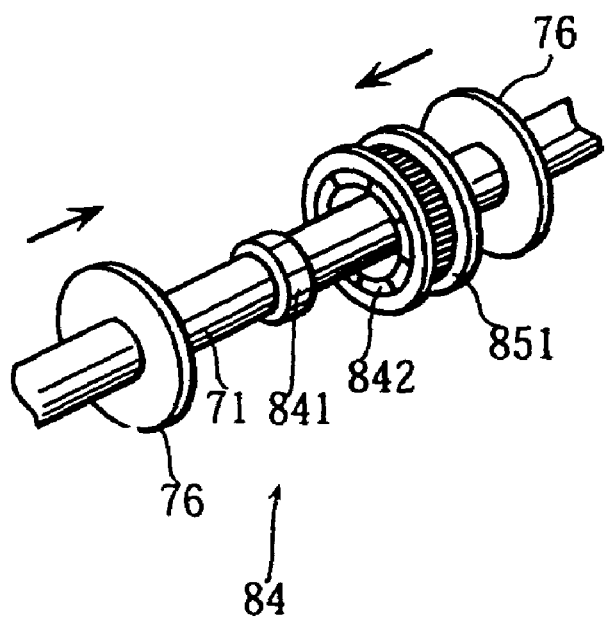
FIG. 12 is a perspective view showing a construction of the drive-dividing unit shown in FIG. 10.

The drive branching unit 84 has two flanges 76 that are set on the both sides of the driving pulley 851 and rotate coaxial with the output shaft 71 as indicated in FIG. 12. With this construction, the driving pulley 851 can also rotate coaxial with the output shaft 71.

In FIG. 10, the second drive transfer unit 85 employs a belt transmission mechanism. This belt transmission mechanism is composed of the driving pulley 851 fixed to the outer surface of the outer magnetic ring 842, a slave pulley 852 fixed to the shaft 47 of the developing roller 37, and a timing belt 853 running over the driving pulley 851 and the slave pulley 852. The second drive transfer unit 85 is not limited to the belt transmission mechanism, and may employ a gear transmission mechanism.

With the stated construction of the driving system, the rotational force of the driving motor 501 is transferred to the photosensitive drum 31 at a high torque via the planetary-roller reduction device 502 and the output shaft 71.

Meanwhile, when the output shaft 71 rotates, the inner magnetic ring 841 of the drive branching unit 84 accordingly rotates. Together with the rotation of the inner magnetic ring 841, the outer magnetic ring 842 rotates according to the magnetic linking force and so does the driving pulley 851.

Together with the rotation of the driving pulley 851, the slave pulley 852 also rotates via the timing belt 853. As a result, the rotational force of the driving motor 501 is transferred to the developing roller 37.

Accordingly, the photosensitive drum 31 and the developing roller 37 do not have to be driven by separate motors. Both the drum 31 and the roller 37 can be driven by on motor, the driving motor 501. Consequently, space for setting the rotator driving device can be saved as compared with a case where the photosensitive drum 31 and the developing roller 37 are driven by separate motors. Now, suppose that load fluctuations, such as vibration, occur to the developing unit 38. In such a case, the load fluctuations at a low frequency are attenuated owing to non-contact effect or to that the inner and outer rings 841 and 842 rotate together strictly due to the magnetic attraction, not the mechanical tight connection by means of, such as a gear mechanism. Consequently, the load fluctuations are prevented beforehand from adversely affecting the rotation of the photosensitive drum 31.

In the present embodiment, the inner and outer magnetic rings 841 and 842 are not in contact with each other and magnetically attracted to each other. However, the magnetic rings 841 and 842 may be in contact with each other as long as they rotate in relation to each other. Although the magnetic rings 841 and 842 are provided for the drive branching unit 84 in the present embodiment, they may be provided for the slave pulley 852 and the shaft 47 of the developing roller 37 respectively.

In the present embodiment, the inner and outer magnetic rings 841 and 842 are polarized. However, magnets, such as permanent magnets or electromagnets, can be set at positions where the inner and outer magnetic rings 841 and 842 face each other.

In a case where the permanent magnets are used, wiring does not need to be installed as is the case with the present embodiment and, therefore, the construction can be simplified. Meanwhile, in a case where the electromagnets are used, the magnetic attraction can be variably changed by adjusting the amount of current passing through the electromagnets.

In the latter case, when the electromagnets are provided for the outer magnetic ring 842, power can be supplied by means of the following construction. A pair of electrodes used for supplying power to the electromagnets are each formed in a ring shape and set on the outer side face of one of the flanges 76 so as to be coaxial with the output shaft 71. The pair of electrodes is thus exposed, and brush members used for power supply are fixed corresponding to the pair of electrodes, with the respective ends of the brush members contacting the electrodes. Accordingly, power can be easily supplied to the outer magnetic ring 842 that is being rotating. When the electromagnets are provided for the inner magnetic ring 841, the output shaft 71, for example, may be formed in a hollow-body shaft. Then, a power supplying line connected to the electromagnets is installed inside the hollow-body shaft. By doing so, the power supply can be easily achieved.

When the drive branching unit 84 has the construction whereby the rotational force of the driving motor 501 is transferred by the magnetic attraction, the construction is not limited to the stated examples. For example, the inner and outer magnetic rings 841 and 842 may be set in parallel on the output shaft 71 so that the magnetic attraction acts between the facing parts of the magnetic rings 841 and 842.

The setting position of the planetary-roller reduction device 502 can be freely determined. To be more specific, the planetary-roller reduction device 502 may be set on either the upstream side or the downstream side of the drive branching unit 84 in the direction in which the rotational force of the driving motor 501 is transferred.

The rotational speed of the driving motor 501 is controlled using the speed detector 73 of the driving device 520 in the present embodiment. This control operation is performed in the same way as described in the second embodiment and, therefore, the explanation is omitted in the present embodiment.

In the second and third embodiments, the photosensitive drums 31C to 31K and the developing rollers 37C to 37K are described as examples of the plurality of rotators that are driven by the same rotator driving device. When the copier includes an image holding unit aside from the photosensitive drum, such as a transfer drum or intermediate transfer unit, the rotational force of the driving motor may be transferred to such an image holding unit. Similarly, aside from the developing roller 37, the branched rotational force may be transferred to a rotator such as a roller, brush, belt, or the like used for charge, image transfer, cleaning, toner fixing, and paper feeding. It should be obvious that the number of rotators to which one rotator driving device transfers the rotational force may be equal to or more than three.

In the preceding embodiments, the description has been given for a case where the present invention is applied to a tandem-type digital color copier. The application of the present invention is not limited to the described embodiments, and can be applied to an image forming apparatus that has a driving device for rotationally driving a rotator, such as a photosensitive drum. Also, the application of the present invention is not limited to a copier employing the electrophotographic method, and can be applied to various image forming apparatuses, such as a copier employing the direct-writing method. Additionally, the present invention is not limited to be included in the image forming apparatus. The rotator driving device and driving method of the present invention can be used for other kinds of appliances that have various rotators.

Although the present invention has been fully described by way of examples with reference to the accompanying drawings, it is to be noted that various changes and modifications will be apparent to those skilled in the art.

Therefore, unless such changes and modifications depart from the scope of the present invention, they should be construed as being included therein.

What is claimed is:

1. A rotator driving device that drives first and second rotators, comprising:
   a motor that supplies a rotational drive force to the first rotator; and
   a drive branching unit that branches the rotational drive force, the branched rotational drive force being used for driving the second rotator, wherein
   the drive branching unit has a main rotating member and a slave rotating member fixed inside a drive pulley which is configured to drive the second rotator via a belt, the main and slave rotating members rotating in a common direction,
   the main rotating member is set coaxial with the first rotator and rotates as the first rotator rotates, the main rotating member has an outer surface with a first plurality of alternating north and south poles set in the direction of rotation of the first rotator,
   the slave rotating member has a second plurality of alternating north and south poles set in the direction of rotation of the driving pulley along an inner surface of the drive pulley, all of the first plurality of alternating north and south poles of the main rotating member are set facing with all of the second plurality of alternating north and south poles of the slave rotating member, and the slave rotating member rotates together with the main rotating member owing to a magnetic action exerted between the first and second plurality of alternating north and south poles.

2. The rotator driving device of claim 1,
wherein said each of the first and second plurality of alternating north and south poles are set with a same pitch.

3. The rotator driving device of claim 1
wherein the magnetic action is exerted owing to a magnetic attraction between opposite poles.

4. The rotator driving device of claim 1,
wherein the first and second plurality of alternating north and south poles each comprises an electromagnet.

5. The rotator driving device of claim 1 further comprising:
a speed reducer that outputs a rotational speed that is reduced with respect to a rotational speed of the motor, and transfers the rotational drive force of the motor to the first rotator, the speed reducer being set between the first rotator and the motor in a path in which the rotational drive force of the motor is transferred;
a speed detector that detects a rotational speed of the first rotator; and
a controller that controls the rotational speed of the motor in accordance with a detection result obtained by the speed detector.

6. The rotator driving device of claim 5,
wherein the speed reducer is a planetary-roller reduction unit.

7. The rotator driving device of claim 5,
wherein the speed detector is a pulse encoder that outputs a pulse at a frequency corresponding to the detected rotational speed of the first rotator.

8. The rotator driving device of claim 7,
wherein the controller controls, in accordance with a difference in frequency between the pulse outputted by the pulse encoder and a standard pulse that corresponds to a predetermined rotational speed set for the rotator, the rotational speed of the motor so that the rotator rotates at the predetermined rotational speed.

9. The rotator driving device of claim 8,
wherein the controller has a phase difference detecting unit for detecting a difference in phase between the pulse outputted by the pulse encoder and the standard pulse, and controls, in accordance with each difference in frequency and phase between the pulse outputted by the pulse encoder and the standard pulse, the rotational speed of the motor so that the rotator rotates at the predetermined rotational speed.

10. An image forming apparatus that has a plurality of rotators, the plurality of rotators including an image holding drum as a first rotator and another rotator as a second rotator, the image forming apparatus comprising a rotator driving device of claim 1 for driving the first and second rotators.

* * * * *

UNITED STATES PATENT AND TRADEMARK OFFICE
CERTIFICATE OF CORRECTION

PATENT NO. : 6,975,053 B2
DATED : December 13, 2005
INVENTOR(S) : Takahiro Tsujimoto et al.

Page 1 of 1

It is certified that error appears in the above-identified patent and that said Letters Patent is hereby corrected as shown below:

<u>Title page,</u>
Item [62], Related U.S. Application Data, after "Pat. No. 6,768,235" add -- which is a Division of application No. 09/522,476, filed on March 9, 2000, now Pat. No. 6,420,807. --.

<u>Column 1,</u>
Line 7, after "Pat. No. 6,768,235" add -- which is a Division of application No. 09/522,476, filed on March 9, 2000, now Pat. No. 6,420,807. --.

Signed and Sealed this

Eighteenth Day of April, 2006

JON W. DUDAS
*Director of the United States Patent and Trademark Office*